United States Patent Office 3,344,929
Patented Oct. 3, 1967

3,344,929
FLUID FILTERS
Peter William Stripp, Billacombe, Plymouth, Devon, England, assignor to Tecalemit (Engineering) Limited, Plymouth, Devon, England
Filed May 7, 1964, Ser. No. 365,697
Claims priority, application Great Britain, May 10, 1963, 18,591/63
9 Claims. (Cl. 210—510)

This invention relates to fluid filters and it has amongst its principal objects the provision of improvements in the construction of filter elements which are formed wholly or partly of fibrous materials, especially synthetic fibres.

Various forms of filter elements are known which make use of natural or synthetic fibres and I have found that particularly efficient filtration can be obtained by using a layer or layers of a filter material which is formed of a matted mass of suitably selected fibres or filaments made of a synthetic plastics substance. One such substance which I have found to be particularly suitable and the use of which is described in the specification of Patent Application Ser. No. 256,616 filed Feb. 6, 1963, now patent 3,229,818, is a copolymer of vinyl chloride and acrylonitrile and which is known under the name "Dynel" or "Dynel-Fibre."

It may be noted also that although the invention is especially applicable to filters for gases, particularly air filters for internal combustion engines, it is not limited to these, but it also is applicable in some of its features to filters for other fluids.

The present invention is not, however, limited to Dynel or to other forms of fibres made from vinyl chloride and acrylonitrile, but it is also applicable to filter elements made of other fibres.

It has been found that in the case of filters for gases, such as for example air filters for internal combustion engines, which use a fibrous material for filtering purposes, a considerable increase in filtering efficiency can be obtained if the fibres are given a thin coating of a non-volatile liquid, such as oil, but difficulties are encountered when fibres are used which are made of impervious synthetic plastics materials, as distinct from natural fibres of animal or vegetable origin and certain other synthetic fibres, particularly cellulose acetate fibres, by reason of the fact that oil and other suitable liquids do not generally cover and remain on the fibres satisfactorily owing to the smooth and impervious nature of the surfaces of the latter.

It is accordingly a further object of the present invention to provide a method of overcoming or at least reducing this difficulty.

A still further object of the invention is to provide improved fluid filters and filter elements which offer useful advantages over previously-known filters and filter elements.

The invention, in one of its aspects, provides a fluid filter element which comprises at least one layer made of a filter material formed of an intermingled mass of fibres, wherein a plurality of filaments made of a different material are provided extending at least partly through the fibrous mass.

The said filaments can be and preferably are made of a material the characteristics of which are such that a film of oil or other non-volatile liquid which will improve the filtering capabilities of the filter will adhere to these filaments better than it does to the fibres of the filter material itself but, apart from this question of the adherence of a liquid film, such filaments can be used to strengthen the fibrous mass of the filter so that the latter will better retain its shape and thickness.

The invention further provides methods of apparatus for use in the manufacture of such filter elements, and the provision of such methods and apparatus represents yet another object of the invention.

Further objects, advantages and features of the invention will become clear from the following description, taken in conjunction with the accompanying drawings.

Referring to the drawings.

Figure 1:
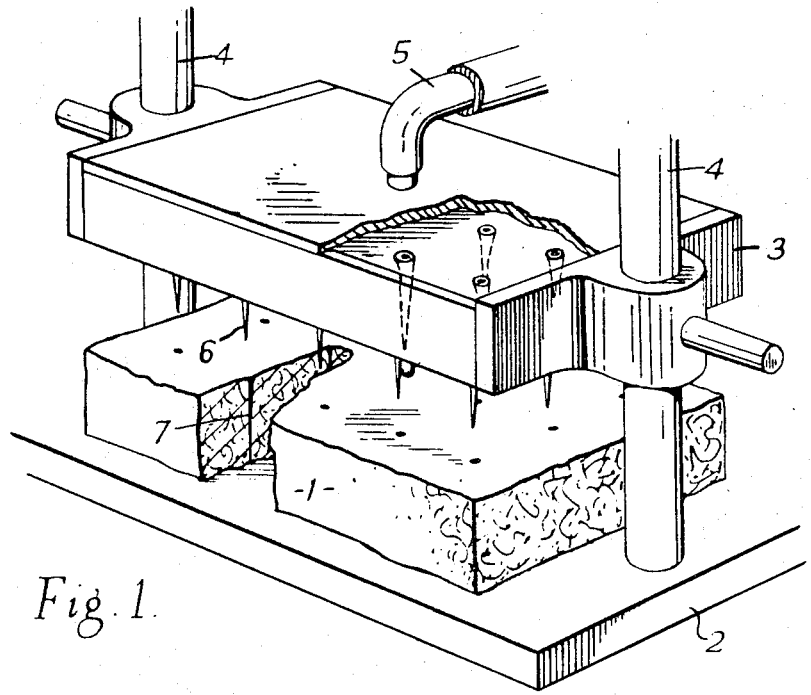
FIGURE 1 is a general view, partly broken-away and in section, showing apparatus used in treating a sheet or slab of fibrous material which is to be used in the construction of a filter element, which may be one intended for use in the air filter of an internal combustion engine.

Referring first to FIGURE 1 of the drawings, this shows apparatus which is used for treating a previously formed slab or sheet 1 which is formed of a mass of "Dynel," such for example as a copolymer of vinyl chloride and acrylonitrile or other synthetic fibres. The object of the apparatus shown in FIGURE 1 is to form through the fibrous mass a series of strands or filaments which are made of a different material and which provide useful advantages. These advantages may include not only an improved capacity for retaining a non-volatile liquid in the filter material, but also a strengthening of the latter in order to improve its strength and cause it better to maintain its shape and thickness.

The apparatus which is shown in FIGURE 1 comprises a base 2 and a press 3, which latter is mounted on columns 4 for up and down movement (effected by means not shown) relatively to the base 2.

The press 3 takes the form of a flat, closed tank having an inlet 5 through which a suitable material, the purpose of which will be described, can be supplied to the tank. A suitable material is a cellulose acetate composition in liquid form.

Distributed over the bottom of the press tank 3 are a number of hollow injection needles 6, which may be of finely tapered form. Their length is sufficient for them to extend to or close to the bottom of the slab 1.

In use the press tank 3 is lowered so that the needles 6 penetrate through, or almost through, the slab 1, after which the press tank 3 is slowly raised while at the same time cellulose acetate is supplied to it under pressure sufficient to cause the cellulose acetate to be discharged through the needles 6. There are thus formed within the slab 1 a series of cellulose acetate strands or filaments 7 which run at right angles to the thickness of the slab. These filaments may be and preferably are substantially thicker and stiffer than the fibres of the slab 1.

It has been found that the presence of these filaments 7 provides two important advantages. In the first place, when the slab 1 is made of Dynel or other impervious fibres, the less impervious filaments 7 tend to retain oil or other liquid within the filter material. This produces a tendency for a film of this liquid to be better retained on the impervious fibres, as well as on the move pervious cellulose acetate filaments themselves.

A further advantage which is provided by the filaments 7 is that they stiffen the fibrous mass and assist in maintaining its shape and in preventing its collapse.

This last effect does not rely on the filaments 7 being formed of a pervious material and any of a wide range of synthetic plastics or other materials could be used.

Figure 2:
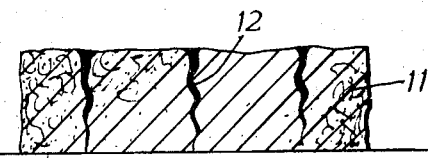
FIGURE 2 is a sectional view showing a slab of filter material which has been treated by a modification of the method shown in FIGURE 1.

FIGURE 2 shows a slab of filter material 11 which includes filaments 12 which have been produced using a modification of the apparatus shown in FIGURE 1. In this case the press tank 3 carrying the injection needles 6 is given an oscillatory or circulatory movement while the needles are being withdrawn from the filter slab; as a result the filaments 12 are produced with a zig-zag or helical form. This provides advantages over the use of simple straight filaments.

Figure 3:
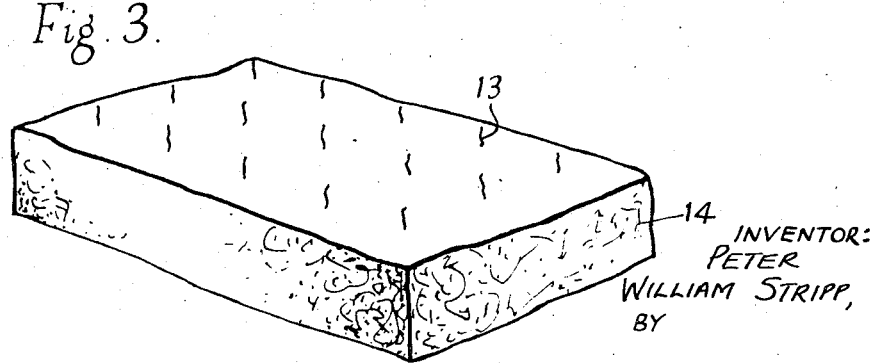
FIGURE 3 is a perspective view showing another modified form of treated filter material.

It is also possible to insert previously-formed strands or filaments into a sheet or slab of a fibrous filter material; the ends of such strands or filaments are shown at 13 in FIGURE 3, where they project from a slab of filter material 14. In this case the filaments need not be made of an extrudable or injectable material but they could be made of any suitable solid materials, including synthetic plastic substances and metals.

I claim:

1. A fluid filter element consisting essentially of at least one layer made of a filter material formed of an intermingled mass of fibres of impervious synthetic materials to which oil will not readily adhere, and a plurality of filaments made of a cellulose material to which oil will readily adhere, said filaments extending in a direction substantially at right angles to the thickness of said layer.

2. A filter element according to claim 1, wherein the said fibres are formed of a copolymer of vinyl chloride and acrylonitrile.

3. A filter element according to claim 1, wherein the said plurality of filaments are of greater diameter and of greater rigidity than the fibers included in said intermingled mass.

4. A filter element according to claim 1, wherein the said plurality of filaments assist in maintaining the said thickness.

5. A filter element according to claim 1, wherein the said plurality of filaments are each of zig-zag form along the longitudinal extent thereof.

6. A filter element according to claim 1, wherein the said plurality of filaments are each of helical form along the longitudinal extent thereof.

7. A filter element according to claim 1, wherein each of said plurality of filaments is coated with oil.

8. A filter element according to claim 1, wherein each of said plurality of filaments is formed of cellulose acetate.

9. A fluid filter element for use as an air filter consisting essentially of at least one layer made of a filter material formed of an intermingled mass of fibres of impervious synthetic materials to which oil will not readily adhere and a series of cellulose filaments to which oil will readily adhere extending at least partially through the said mass of fibres and in a direction substantially at right angles to the thickness of said layer.

References Cited

UNITED STATES PATENTS 2,430,868 11/1947 Francis _____ 210—510 X
3,059,312 10/1962 Jamieson.

OTHER REFERENCES

The Condensed Chemical Dictionary, Reinhold, 1961, p. 429.

LEON D. ROSDOL, *Primary Examiner.*

I. GLUCK, *Assistant Examiner.*